United States Patent [19]

Menashi et al.

[11] Patent Number: 5,063,179

[45] Date of Patent: Nov. 5, 1991

[54] PROCESS FOR MAKING NON-POROUS MICRON-SIZED HIGH PURITY SILICA

[75] Inventors: Jameel Menashi, Lexington, Mass.; Kenneth C. Koehlert, Champaigne, Ill.

[73] Assignee: Cabot Corporation, Waltham, Mass.

[21] Appl. No.: 490,005

[22] Filed: Mar. 2, 1990

[51] Int. Cl.$^5$ .......................... C03C 3/06; C01B 33/12
[52] U.S. Cl. ......................................... 501/12; 501/54; 501/154; 423/335; 423/338; 65/21.1; 65/21.4
[58] Field of Search .................... 501/133, 154, 12, 37, 501/53, 54; 423/335, 338; 65/21.4, 22, 30.12, 3.12, 21.1

[56] References Cited

U.S. PATENT DOCUMENTS

| | | | |
|---|---|---|---|
| 3,301,635 | 1/1967 | Bergna et al. | 423/335 |
| 3,501,269 | 3/1970 | Winyall et al. | 423/338 |
| 4,105,427 | 8/1978 | Elmer | 65/30.12 |
| 4,317,668 | 3/1982 | Susa et al. | 501/12 |
| 4,419,115 | 12/1983 | Johnson et al. | 501/12 |
| 4,459,245 | 7/1984 | Ryon et al. | 264/14 |
| 4,572,729 | 2/1986 | Lang et al. | 264/56 |
| 4,681,615 | 7/1987 | Toki et al. | 65/18.1 |
| 4,810,415 | 3/1989 | Winkelbauer et al. | 423/335 |
| 4,840,653 | 6/1989 | Rabinovich | 65/3.12 |

FOREIGN PATENT DOCUMENTS

| | | | |
|---|---|---|---|
| 3291807 | 11/1988 | Japan | 423/338 |
| 2057423 | 4/1981 | United Kingdom . | |

OTHER PUBLICATIONS

"Sol Gel Processing of Ceramics and Glass", David Johnson, Jr., Ceramic Bulletin, vol. 64, No. 12 (1985), pp. 1597–1602.

*Primary Examiner*—William R. Dixon, Jr.
*Assistant Examiner*—Paul Marcantoni
*Attorney, Agent, or Firm*—David J. Koris

[57] ABSTRACT

A process for making non-porous, dense, silica partices having a diameter of about 3 to 1000 microns, a nitrogen B.E.T. surface area less than about 1 m$^2$/g, a total impurity content of less than about 50 ppm and a metal impurity content content of less than about 15 ppm from an aqueous dispersion of fumed silica. The particles are converted into porous particles and sintered in an atmosphere having a water partial pressure of from about 0.2 to about 0.8 atmosphere for temperatures below about 1200° C.

11 Claims, No Drawings

PROCESS FOR MAKING NON-POROUS MICRON-SIZED HIGH PURITY SILICA

FIELD OF THE INVENTION

The present invention relates to a process for making particulate silica.

BACKGROUND OF THE INVENTION

The present invention concerns a process for synthesizing nonporous high purity silica particles. Such silicas may be further characterized as having skeletal densities of approximately 2.21 g/cc (which are comparable with or nearly comparable with that of vitreous silica), average particle sizes in the range of 3 to 1000 microns, nitrogen B.E.T. surface areas which are less than about 1 m$^2$/g, total impurity content of less than about 50 parts per million (ppm) which is inclusive of a metal impurity content of less than about 15 ppm. Since the sizes of these silica particles are measured in microns, it is convenient to call them "micron-sized" silicas.

Non-porous, high purity micron-sized silicas can be used in a variety of applications such as in the production of quartz tubes and crucibles, in the production of optical fibers and in filling epoxy molding compounds. Non-porous, micron-sized silicas are required to attain good flow properties and to attain high packing density in dies in the manufacture of quartz crucibles. Similar properties are required to attain high solids loading levels in epoxy molding compounds. Impurities in the silicas adversely affect product performance properties. The quality of silicon crystals, formed from melts contained in quartz crucibles, can be degraded by impurities in the quartz crucibles. Examples of such impurities include aluminum, boron, alkali metals and transition metals at the parts per million levels. Similarly, contaminants in optical fibers, such as transition metals or silanol groups, cause signal attenuation. Epoxy molding compounds used in encapsulating large capacity dynamic random access memory chips must have low alpha particle emissions. This requires the use of silica fillers having uranium and thorium contents at the low part per billion (ppb) level, since these elements are the source of the alpha emissions.

Many methods are described in the literature for forming dense, high purity silica bodies. These methods, typically, involve sintering to full density or nearly full density, high purity porous silica bodies which are derived from high purity silica precursors. In principle, such processes can be modified to form porous, micron-sized, high purity silica particles which can subsequently be sintered to form the desired products for these uses. Porous particles can be formed by spray drying silica dispersions, by crushing porous silica bodies followed by screening to isolate the desired particle size fraction and by sol-gel processing as, for example, described by Ryon et al. in U.S. Pat. No. 4,459,245 or by Porchia et al. in European Patent Application 0255321. Moreover, because particle mass varies with the cube root of particle size, the average size of the sintered product will, at most, be a factor of 2 smaller than the average size of the porous particles from which they are derived and which have a porosity of less than 85%.

Practical implementation of a process to form the desired non-porous, dense, micron-sized silica particles by sintering porous silica particles requires the simultaneous attainment of at least five criteria. These are:

I. A low cost high purity silica or silica precursor.
II. Avoidance of product contamination during processing.
III. Final product particles containing little or no porosity.
IV. Product particles with little or no silanol content.
V. Rapid processing times.

A sixth optional, but preferred, criterion is that the purity of the silica can be readily upgraded during processing.

The conditions required to attain Criterion II are readily stated. All operations employed in the process to form the desired silica product must be compatible with the use of processing equipment which is constructed of or lined with either a polymeric material or fused quartz. Organic contaminants picked up from the polymeric materials can be burned off prior to or during sintering. Contamination of the products with fused quartz is of little concern. The material of choice in all high temperature operations is fused quartz.

Fused quartz is costly and its use will place a severe constraint on the maximum temperature employed in the process. Fused quartz begins to soften at temperatures above about 1100° C. Moreover, as noted in the Mar. 1970 issue of Design Engineering, the maximum recommended temperature for continuous use of fused quartz is about 1000° C. Only short-term use is recommended at 1300° C. As the temperature is reduced, the use time of fused quartz is extended. In view of the high cost of fused quartz, for practical implementation of a sintering process, the maximum temperature employed should be less than about 1200° C., more preferably, should be less than about 1150° C. and, most preferably, should be less than about 1100° C.

Many groups of workers have described the synthesis of high purity silica glasses using silicas derived from silicon alkoxides such as tetramethyl orthosilicate and tetraethyl orthosilicate. Typically, a silica sol or silica gel is formed by hydrolysis of the alkoxide dissolved in an alcohol such as methanol, ethanol or isopropanol. Since all reagents employed are easily purifiable and since the hydrolysis reaction can be conducted in polymeric vessels, silicas with extremely low levels of inorganic contaminants can be formed.

Sacks and Tseng, in Journal of American Ceramic Society, Vol. 67, 526 (1984) and Vol. 67, 532 (1984), have shown that silicas derived from alkoxides can be utilized to form green bodies which can be sintered to full density or nearly full density at 1000° C. These workers, however, found that residual silanol groups persist at the highest calcination temperature tested, 1050° C.

Matsuyama et al. in Ceramic Bulletin, Vol. 63, 1408 (1984), also studied the synthesis of high purity glasses using silicas derived from alkoxides. These workers found that silanol groups persist in the glass even after sintering at 1300° C. in an atmosphere of helium. The lowest hydroxyl content attained, 360 ppm, was considered to be much too large for optical fiber use. Matsuyama et al. demonstrated that the hydroxyl content can be reduced to negligible levels by subjecting the porous silica to chlorine at temperatures above 800° C. prior to sintering.

Although silicas derived from alkoxides can be extremely pure, can be treated to attain low hydroxyl levels and, probably, can be sintered to nearly full density at 1000° C., their use is not considered in the process of the present invention because they are costly. Their high cost is attributed to the combined cost of the alkoxide and the alcohol used in forming the silicas. Accordingly, such silicas do not satisfy Criterion I set forth above.

Lang et al., In U.S. Pat. No. 4,572,729, describe a process for forming silica articles using high purity $SiCl_4$ as the silica precursor. In this method high purity water is added to a stoichiometric excess of $SiCl_4$ to form $SiO_2$ and HCl gas. After removal of the HCl and the unreacted $SiCl_4$ (by heating to about 900° C.), the resulting silica was described as having a particularly low hydroxyl content. The silica was molded into a desired shape and then sintered at temperatures in the range of 1000° C. to 1300° C. The resulting body, which presumably was porous, was superficially fused by the action of a hydrogen-oxygen flame which burns at a temperature exceeding 1300° C. Accordingly, in view of the high sintering temperature required to sinter to full density, the process of Lang et al., because of Criterion II, cannot be readily modified to make non-porous, large particle size, high purity silica.

Other workers have described the synthesis of high purity silica glasses using fumed or pyrogenic silicas produced by the flame hydrolysis of silicon tetrachloride, chlorosilanes, organic silicon compounds and mixtures thereof. As pointed out by Clasen, in Journal of Materials Science Letters, 7, 477 (1988), fumed silicas represent inexpensive starting materials which are produced on an industrial scale. Scherer, in Journal of the American Ceramic Society, 60, 236 (1977), indicates that silicas produced by flame hydrolysis can contain less than 10 ppm total impurities. Further, Clasen showed that treatment of a fumed silica having less than 1 ppm each of Na, K, Fe, Ni, Cr, Cu, Co, Mo and Zr in an atmosphere containing $SOCl_2$ and $O_2$ at 1100° C. reduces the impurity levels of Fe, Co, Ni, Cr and, probably, Cu and Mo to the ppb (parts per billion) level. Clasen also implies that the treatment reduces the hydroxyl content of the silica.

The formation of dense silica bodies from fumed silica, typically, requires the use of sintering temperatures in excess of 1200° C. For example, Rabinovich et al., in Journal of the American Ceramic Society, 66, 683 (1983), 66, 688 (1983) and 66, 693 (1983), produced green bodies from aqueous fumed silica dispersions containing 40 weight % solids. These bodies could be sintered to nearly theoretical densities only at temperatures in excess of 1300° C. The sintering atmosphere employed had a bearing on the hydroxyl concentration in the sintered body. For example, a helium atmosphere containing 3%, by volume, chlorine was found to be useful in removing bound hydroxyl groups.

Clasen formed other fumed silica dispersions containing up to 55 weight % solids. Green bodies derived from these dispersions were zone-sintered at 1500° C.

Rabinovich, in Journal of Materials Science, 20, 4259 (1985), reviewed the preparation of glass articles by sintering. He indicated that defect-free glasses can be prepared from fumed silicas, using an undisclosed process, by sintering at temperatures as low as 1260° C. to 1300° C. Dehydration in a chlorine containing atmosphere reduced hydroxyl concentration to below 1 ppm.

The above discussion demonstrates that although fumed silicas can serve as an excellent source of high purity silica, green bodies derived from such silicas do not sinter to nearly theoretical densities, at least under conventional conditions, at temperatures of less than 1200° C.

It is known that humid atmospheres markedly accelerate the sintering rates of porous silica bodies. Scherer, in Journal of American Ceramic Society, 60, 239 (1977), and Tseng et al., in Journal of Materials Science, 21, 3615 (1986), attribute the enhanced sintering rate to the water vapor interacting with the silica to form silanol groups.

SUMMARY OF THE INVENTION

It has now been found that porous silica particles can be sintered in humid atmospheres without introduction of unacceptable levels of hydroxyl groups. This observation has permitted development of a process which satisfies all the criteria listed above. It is an object of this invention to produce dense, non-porous, high purity, micron-sized silica from fumed silica. Such silicas may be further characterized as having skeletal densities of approximately 2.21 g/cc (which are comparable with or nearly comparable with that of vitreous silica), average particle sizes in the range of 3 to 1000 microns, nitrogen B.E.T. surface areas which are less than about 1 $m^2/g$, total impurity content of less than about 50 parts per million (ppm) which is inclusive of a metal impurity content of less than about 15 ppm. The process is as follows:

1) Forming an aqueous dispersion of fumed silica.
2) Optionally, filtering the aqueous dispersion to remove particulate impurities.
3) Converting the aqueous dispersion into porous particles.
4) Optionally, further purifying the silica to remove metal impurities.
5) Sintering the porous particles to nearly theoretical densities at temperatures below 1200° C., preferably 1050° to 1150° C.

DESCRIPTION OF THE PREFERRED EMBODIMENT

Turning now to the details of the method of the present invention, all reagents employed must be of high purity. By this it is meant that the reagents, including water, must be of sufficient purity level that they do not add significant levels of inorganic contaminants to the fumed silica. In general, and depending on the amount of each reagent employed, it is preferred that the inorganic impurity content of each reagent be an order of magnitude smaller than the impurities present in the fumed silica. Further, during processing, all reagents and products are contacted only with either a polymeric material such as polyethylene or polytetrafluoroethylene or with fused quartz. In addition, care is taken to avoid reagent contamination by ambient contaminants such as dust which, typically, necessitates working in a clean, dust-free environment.

A fumed silica is first dispersed into high purity water, optionally containing a volatile, water soluble acid such as acetic acid, formic acid or hydrochloric acid as a dispersion aid. Alternatively, volatile, water soluble bases such as ammonium hydroxide, can be added as viscosity control agents. The resulting dispersion, depending on dispersion intensity, surface area of fumed silica used, dispersion aids employed and final dispersion rheology required, contains from about 5 up to about 55 weight percent silica. This dispersion can optionally be filtered through bag filters or other types of filters with pore size ratings of from 1 to 100 microns to remove particulate impurities. The dispersion is then converted into porous particles having an average size in the range of 3 to 1000 microns by any known method, such as the following three methods:

1) By spray drying the silica dispersion.
2) By drying the silica dispersion, preferably at temperatures in the range of 100° C. to 200° C., crushing the resulting friable solids and screening to collect the desired size fraction.
3) By gelling microspheres of the aqueous silica dispersion in an organic medium (sol-gel processing) followed by recovering and drying the gelled microspheres. One technique that may be employed to transform the fumed silica sol to gelled microspheres is the internal gelation procedure described by Haas et al., in Ind. Eng. Chem. Prod. Res. Dev., 22, 461 (1983). The method is based on the addition of hexamethylenetetramine to the silica sol which, on heating, decomposes to give ammonia and formaldehyde.

The resulting porous particles are optionally treated to effect purification of the silica to remove metallic impurities. This is accomplished by heating the silica in an atmosphere of air or nitrogen containing up to about 3%, by volume, $SOCl_2$ or $Cl_2$ to a temperature of 900° C. to 1100° C. and held at that temperature for at least about 30 minutes. Thereafter, addition of $Cl_2$ or $SOCl_2$ is discontinued. After sweeping out the $Cl_2$ or $SOCl_2$, the atmosphere is switched to humid nitrogen or humid air, by which is meant the water partial pressure in the atmosphere ranges from about 0.2 to about 0.8 atmosphere. The silica is then heated to a temperature in the range of 1080° C. to about 1175° C. and held at that temperature for a period of time ranging from about 30 minutes to about 12 hours to sinter the silica to near theoretical density. If the preferred but optional purification step is omitted, the porous silica can be heated directly to the prescribed sintering temperature range in the humid atmosphere. After sintering, the atmosphere is switched to dry air or dry nitrogen. The silica is maintained at the sintering temperature for a time period ranging from about 5 to about 60 minutes and then allowed to cool under the flow of dry nitrogen or dry air. The resulting nonporous, dense, micron-sized, high purity silica product is packed in plastic lined containers.

It is believed that one skilled in the art, using the preceding description, can utilize the present invention without further elaboration. The following examples are, therefore, presented to illustrate the invention.

EXAMPLES 1-7

To 196 g of high purity water (distilled, filtered and deionized) and 4 g of an aqueous solution of 28 weight % $NH_3$ in a polytetrafluoroethylene beaker, 45 g of fumed silica, which in Examples 1-5 has a nitrogen B.E.T. surface area of 200 m$^2$/g, and in Examples 6 and 7 has a surface area of 255 m$^2$/g, was slowly added with stirring. Stirring was accomplished with a polytetrafluoroethylene rod so that very low shear dispersion was employed. The resulting paste, containing about 18 weight % silica, was dried in the beaker in a vacuum oven at 100° C. Considerable shrinkage was evident after the paste was dried.

The dried, friable cake was crushed with the polytetrafluoroethylene rod and screened through polyethylene screens. Porous silica particles having sizes in the range of 250 to 425 microns were collected. Particles larger than 425 microns were recrushed and screened. The crushing and screening operations were conducted either in a clean room or in a laminar flow hood to minimize contamination by air-borne solids.

A quartz boat, 6 inches long, 1.75 inches wide and 1 inch high, was filled with a sample of the 250 to 425 micron size powder and then inserted in a 2 inch diameter quartz tube placed in an electrically heated tube furnace. After insertion of the sample the tube was continuously swept with a stream of dry nitrogen. Heating was initiated and when the furnace temperature exceeded about 300° C. the sweep atmosphere was switched to humid nitrogen, except for example 6 which was used as a control. The humid nitrogen was produced by bubbling the nitrogen through a fritted tube in a water bath maintained at 82° C. The water partial pressure was about 0.5 atmosphere.

The sample was heated to a prescribed furnace temperature and maintained at that temperature for a prescribed period of time as shown in Table I. Thereafter, the sweep gas was switched to dry nitrogen. After holding the sample at the prescribed temperature for 5 to 30 minutes, the sample was allowed to cool under dry nitrogen to about ambient temperature and, finally, stored in polyethylene or polypropylene bottles. The sample was characterized with respect to its surface area using nitrogen as the adsorbent by the BET (Brunauer, Emmett and Teller) procedure.

The final surface area of the sample is an indication of the completeness of sample sintering. The lower the final surface area of the sample, the more complete the sintering.

The effects of temperature and time on the surface area of the samples are presented in Table I. This table shows that increasing the temperature and/or increasing the heating time result in the production of a final product with lower surface area. In particular, a comparison of Example number 2 with number 4 shows that a higher temperature gives a lower surface area, at a constant time of 2 hours. Also, a comparison of Example number 2 with number 3 shows that a longer heating time results in a lower surface area, at a given temperature.

Further, a comparison of Example number 6 with number 7 shows that a humid atmosphere is essential for the sintering process.

TABLE I

Surface Areas Of Porous Silica Particles Sintered In Humid Nitrogen

| Example Number | Furnace Temperature, (°C.) | Water Vapor Partial Pressure (atm) | Heating Time (hours) | Initial S.A. (m$^2$/g) | Final S.A. (m$^2$/g) |
|---|---|---|---|---|---|
| 1 | 1000 | 0.5 | 1 | 200 | 143 |
| 2 | 1050 | 0.5 | 2 | 200 | 114 |
| 3 | 1050 | 0.5 | 7 | 200 | 25 |
| 4 | 1100 | 0.5 | 2 | 200 | <1 |
| 5 | 1100 | 0.5 | 5 | 200 | <1 |
| 6 (control) | 1100 | 0 | 8 | 255 | 131 |
| 7 | 1100 | 0.5 | 6 | 255 | 4 |

EXAMPLES 8-10

Silica samples were prepared according to the methods given for Examples 1-5 except for the following: the addition of $NH_3$ to the water was omitted; the screened particle size of the porous silica was less than 425 microns; sintering was effected at a furnace temperature of 1155° C. (sample temperature was about 1134° C.) in humid nitrogen for 3 hours.

To determine the extent of contamination occurring during processing, the impurity contents of the fumed silica, Example 8, the dried porous gel particles, Example 9, and the sintered product, Example 10, were determined. These were obtained by dissolution of the samples in an aqueous HF/H$_2$SO$_4$ mixture (to evolve SiF$_4$), evaporation until SO$_3$ fumes were evolved and dissolution of the residue in dilute HCl. The alkali metals were analyzed by atomic absorption (AA); the remainder of the elements were analyzed by inductively coupled plasma spectroscopy (ICP). Blanks were also run (no silica added) to correct for contamination from the ambient atmosphere during the analysis. Significant blank corrections were required for some elements such as Fe and Na.

The analytical data obtained are summarized in Table II. They indicate that the purity of the sintered product (Example 10) compares favorably with that of the starting fumed silica (Example 8). However, some increased levels of Ca and Ti are evident. Since the laboratory in which the dispersion was produced was known to be heavily contaminated with TiO$_2$ (and, probably, Ca), the increased levels of these contaminants are not surprising. The data demonstrate the need for insuring that clean ambient conditions are maintained during processing.

TABLE II

Comparison Of Purities Of Silica Samples (in ppm)

| Element | Fumed Silica Example 8 | Dried Porous Gel Example 9 | Sintered Product Example 10 |
|---|---|---|---|
| Na | 1.2 | 1.0 | 1.0 |
| K | 0.4 | 0.1 | 1.1 |
| Li | 0.1 | 0.02 | 0.04 |
| Al | 2.1 | 2.4 | 2.8 |
| Fe | 1.0 | 1.8 | 1.2 |
| Ni | 1.8 | 1.6 | 2.0 |
| Ca | 0.4 | 1.2 | 1.6 |
| Mg | 0.14 | 0.16 | 0.2 |
| Ti | 0.18 | 1.2 | 0.8 |

Semi-quantitative emission spectrographic analysis indicated that the levels of other impurities in the samples of Examples 8, 9 and 10 were all below the detection limits of the method. These impurities together with their detection limits in ppm are as follows: As<100, B<2, Ba<20, Be<2, Bi<2, Co<20, Cr<5, Cu<2, Mn<2, Mo<2, Nb<10, P<200, Pb<5, Sb<20, Sn<5, Sr<100, V<2, Zn<50 and Zr<20.

The product of Example 10 had a surface area of 0.65 m$^2$/g, a tap density of 1.42 g/cc, a skeletal density of 2.22 g/cc and good pour characteristics. The measured skeletal density is close to that of vitreous silica, 2.21 g/cc, indicating that the particles have little or no porosity.

EXAMPLE 11

A sample was prepared in a similar manner to that of Example 10; however, the sample was sintered at a furnace temperature of 1100° C. The average particle size, determined by image analysis, of this sample was about 200 microns.

EXAMPLES 12 AND 13

A second sample of fumed silica, with a nitrogen B.E.T. surface area of 200 m$^2$/g, Example 12, was characterized with respect to its impurity content by AA and ICP measurements as described for Examples 8-10. To obtain a measure of the reproducibility of the analytical data, selected impurities were determined four times, and the standard deviation, S, of the method for these elements was evaluated.

To prepare Example 13, the fumed silica was dispersed in high purity water in a clean room using the procedures described in Examples 1-5. The dried paste was crushed and porous particles with sizes in the range of 250 to 425 microns were collected. The particles were then sintered in humid nitrogen at a furnace temperature of 1150° C. for two hours, treated with dry nitrogen for 30 minutes and then cooled under nitrogen. The impurity content of this sample, Example 13, was also determined by AA and ICP measurements.

The impurities found in the products of Examples 12 and 13, together with the standard deviations of selected impurities, are listed in Table III. The results show that when the operations are conducted in a clean environment, the impurity content of the fumed silica and the sintered silica are, within the precision of the analysis, comparable. This demonstrates that product contamination during processing in polymer and quartz equipment is not significant. Further, the impurities listed in the table are believed to be the major metallic impurities present in the fumed silica. They total 7.5 ppm for the sample of Example 12 and 6.4 ppm for the product of Example 13. These results demonstrate that fumed silica can be used to form micron-sized silicas containing less than 15 ppm total metallic impurities.

TABLE III

Comparison Of Purities Of Fumed And Processed Silicas

| Element | Fumed Silica Example 12 (ppm) | Standard Deviation s (ppm) | Sintered Silica Particles Example 13 (ppm) |
|---|---|---|---|
| Na | 1.1 | 0.4 | 0.6 |
| K | 0.5 | ND | 0.2 |
| Li | <0.1 | ND | <0.02 |
| Al | 2.0 | 0.4 | 2.3 |
| Fe | 1.2 | 0.6 | 0.6 |
| Ni | <0.8 | ND | 1.8 |
| Ca | 0.7 | 0.4 | 0.3 |
| Mg | 0.9 | ND | 0.4 |
| Ti | 0.2 | 0.1 | 0.2 |

ND = Not Determined

EXAMPLE 14

The uranium content of a sample of fumed silica, determined by neutron activation analysis, was found to be less than the detection limit of the method, 1.2 ppb. This shows that fumed silica exhibits low alpha particle emissions and, thus, is suitable for synthesis of micron-sized silicas having low alpha particle emissions.

What is claimed is:

1. A process for producing nonporous, dense, silica particles having a diameter of about 3 to 1000 microns, and nitrogen B.E.T. surface area less than about 1 m$^2$/g, a total impurity content of less than about 50 ppm and a metal impurity content of less than about 15 ppm, comprising:
   a) Forming an aqueous dispersion of fumed silica containing from about 5 to about 55 weight percent solids;

b) Converting the aqueous dispersion of step (a) into porous particles; and c) Sintering the porous particles of step (b) in an atmosphere having a water partial pressure ranging from 0.2 to 0.8 atmosphere at temperatures below about 1200° C.

2. A process as defined in claim 1 wherein the aqueous dispersion of fumed silica contains a volatile water soluble acid.

3. A process as defined in claim 1 wherein the aqueous dispersion of fumed silica contains a volatile water soluble base.

4. A process as defined in claim 3 which the water soluble base is ammonia hydroxide.

5. A process as defined in claim 1 wherein the micron-sized silica is converted into porous particle silica by drying the aqueous solution of step (a) in an oven at a temperature between about 100° C. to about 200° C., and by comminuting the dried porous particle.

6. A process as defined in claim 1 wherein step (b) is effected by gelling microspheres of the aqueous silica dispersion in an organic medium, and by recovering and drying the porous particle.

7. A process as defined in claim 1 wherein step (b) is effected by spray drying.

8. A process as defined in claim 1 wherein the porous particles of step (b) are sintered in a humid atmosphere having a water partial pressure ranging from about 0.2 to about 0.8 atmospheres at temperatures of less than 1200° C. for a period of time ranging between about 30 minutes and about 12 hours.

9. A process as defined in claim 8 wherein the sintering temperature ranges between about 1080° C. to about 1175° C.

10. A process as defined in claim 1 wherein the porous particles of step (b) are heated to a temperature in a range between about 900° C. to about 1100° C. in an atmosphere containing either about 3% $Cl_2$ or about 3% $SOCl_2$ for a time of at least about 30 minutes.

11. A process as defined in claim 1 wherein the aqueous dispersion of step (a) is filtered to remove particulate impurities.

* * * * *